United States Patent
Igata et al.

[11] Patent Number: 5,311,433
[45] Date of Patent: May 10, 1994

[54] ACCELERATION SLIP CONTROL DEVICE FOR A VEHICLE

[75] Inventors: Hiroshi Igata, Okazaki; Takayoshi Nakatomi, Susono; Kiyoyuki Uchida; Yoshifumi Yagi, both of Toyota, all of Japan

[73] Assignee: Toyota Jidosha Kabushiki Kaisha, Aichi, Japan

[21] Appl. No.: 794,074

[22] Filed: Nov. 19, 1991

[30] Foreign Application Priority Data

Nov. 20, 1990 [JP] Japan .................. 2-312792

[51] Int. Cl.$^5$ .............................................. G06F 7/70
[52] U.S. Cl. ........................... 364/426.01; 364/426.02; 364/426.04; 180/197
[58] Field of Search ............. 364/426.01, 426.02, 364/426.03, 426.04; 180/197, 233, 244, 246; 303/95, 97, 100, 105, 103, 130

[56] References Cited

U.S. PATENT DOCUMENTS

| | | | |
|---|---|---|---|
| 4,733,760 | 3/1988 | Inagaki et al. | 192/3 |
| 4,849,890 | 7/1989 | Inoue et al. | 364/426.02 |
| 4,850,656 | 7/1989 | Ise et al. | 303/100 |
| 4,933,857 | 6/1990 | Hashiguchi et al. | 364/426.02 |
| 5,000,281 | 3/1991 | Nobumoto et al. | 180/197 |
| 5,014,809 | 5/1991 | Matsuda | 180/248 |
| 5,070,461 | 12/1991 | Nobumoto et al. | 364/426.03 |
| 5,077,672 | 12/1991 | Nobumoto et al. | 364/426.03 |

FOREIGN PATENT DOCUMENTS

| | | |
|---|---|---|
| 8909710 | 10/1989 | European Pat. Off. . |
| 0349993 | 10/1990 | European Pat. Off. . |
| 0442500 | 8/1991 | European Pat. Off. . |
| 60-99757 | 6/1985 | Japan . |
| 60099757 | 6/1985 | Japan . |
| 62-3137 | 1/1987 | Japan . |

*Primary Examiner*—Thomas G. Black
*Assistant Examiner*—Jacques H. Louis-Jacques
*Attorney, Agent, or Firm*—Kenyon & Kenyon

[57] ABSTRACT

A device for controlling the slip between driving wheels and a road surface during a start and an acceleration of a vehicle is maintained at a level which ensures a good acceleration and straight line running stability. The device determines a target speed of the rotation of the driving wheels, and controls a drive torque of the driving wheels in such a manner that the actual speed of the rotation of the driving wheels coincides with the target speed. Also, the device detects a friction coefficient between the driving wheels and the road surface, and the slippage of the driving wheels is controlled on the basis of the friction coefficient. Further, the device determines the reliability of the detected friction coefficient, and uses the detected friction coefficient only when the detected friction coefficient is determined to be reliable.

6 Claims, 8 Drawing Sheets

ACCELERATION SLIP CONTROL DEVICE FOR A VEHICLE

BACKGROUND OF THE INVENTION

1. Field of the Invention

This invention relates to an acceleration slip control device for a vehicle by which a slipping of the driving wheels of the vehicle during a start or acceleration of the vehicle is controlled.

2. Description of the Related Art

An acceleration slip control device is commonly used to improve the acceleration and straight line running stability of the vehicle by preventing an excess slippage of the driving wheels during a start or acceleration of the vehicle.

Usually, the acceleration slip control device determines a target speed for the speed of rotation of the driving wheels and controls a drive torque of the driving wheels by a feedback control in such a manner that the deviation of the speed of rotation of the driving wheels from the target speed is maintained at less than a predetermined value.

In such a control, to improve a response and stability of the control, the drive torque is controlled in such a manner that the rate of change of the drive torque is changed according to the magnitude of a friction factor $\mu$ between the driving wheels and a road surface.

For example, when $\mu$ is low (i.e., on a slippery road), the rate of increase of the drive torque is made smaller, to prevent an overshoot and thereby increase the stability of the control. Conversely, when $\mu$ is high, the rate of increase of the drive torque is made larger, to improve the response of the control.

An example of an acceleration slip control device of this type is disclosed in Japanese Unexamined Patent Publication No. 60-99757.

The device disclosed in this Publication calculates the acceleration of the vehicle from the rate of change of the speed of the driven wheels (i.e., a running speed of the vehicle) when a slip occurs between the driving wheels and a road surface. Then the device calculates the friction coefficient between the driving wheels and the road surface from this acceleration, and adjusts the drive torque in accordance with the calculated friction coefficient by a fuel cut operation, etc.

In the acceleration slip control device of the above Publication however, the detected values of the friction coefficients are sometimes different from the actual friction coefficients, especially when frequent changes occur in the road surface conditions. Also errors in detecting the speed of driven wheel can occur, and these errors adversely affect the calculation of the acceleration, and consequently, the calculation of the friction coefficient.

When the acceleration control is carried out on the basis of a friction coefficient higher than the actual friction coefficient, the rate of increase of the drive torque becomes extremely large, and therefore, the stability of the control is worsened because of an increased slip between the driving wheels and the road surface. Conversely, when the control is carried out on the basis of a friction factor lower than the actual friction coefficient, the rate of increase of the drive torque becomes very small, and thus the response of the control, and the acceleration, are worsened.

SUMMARY OF THE INVENTION

An object of the present invention is to solve the above problems by providing an acceleration slip control device which calculates the friction coefficient from the acceleration of the vehicle, determines a reliability of the calculated friction coefficient, and uses that friction coefficient for the control of the drive torque only when that friction coefficient is found to be reliable.

According to the present invention, there is provided an acceleration slip control device comprising: a deviation detecting means for detecting a deviation which is defined as a difference between a speed of rotation of the driving wheels and a target speed; a target speed setting means for determining the target speed according to a running speed of the vehicle; a friction coefficient detecting means for detecting a friction coefficient between the driving wheels and the road surface; a control means for controlling a drive torque of the driving wheels on the basis of the magnitude of the deviation and the friction coefficient in such a manner that the speed of rotation of the driving wheels coincides with the target speed; and a means for determining the reliability of the value of the detected friction coefficient; this means prohibiting the control means from using the detected friction coefficient for the control when the detected friction coefficient is found to be unreliable.

The present invention will be better understood from the description of preferred embodiments thereof as set forth below, with reference to the accompanying drawings.

DESCRIPTION OF A PREFERRED EMBODIMENT

Figure 1:
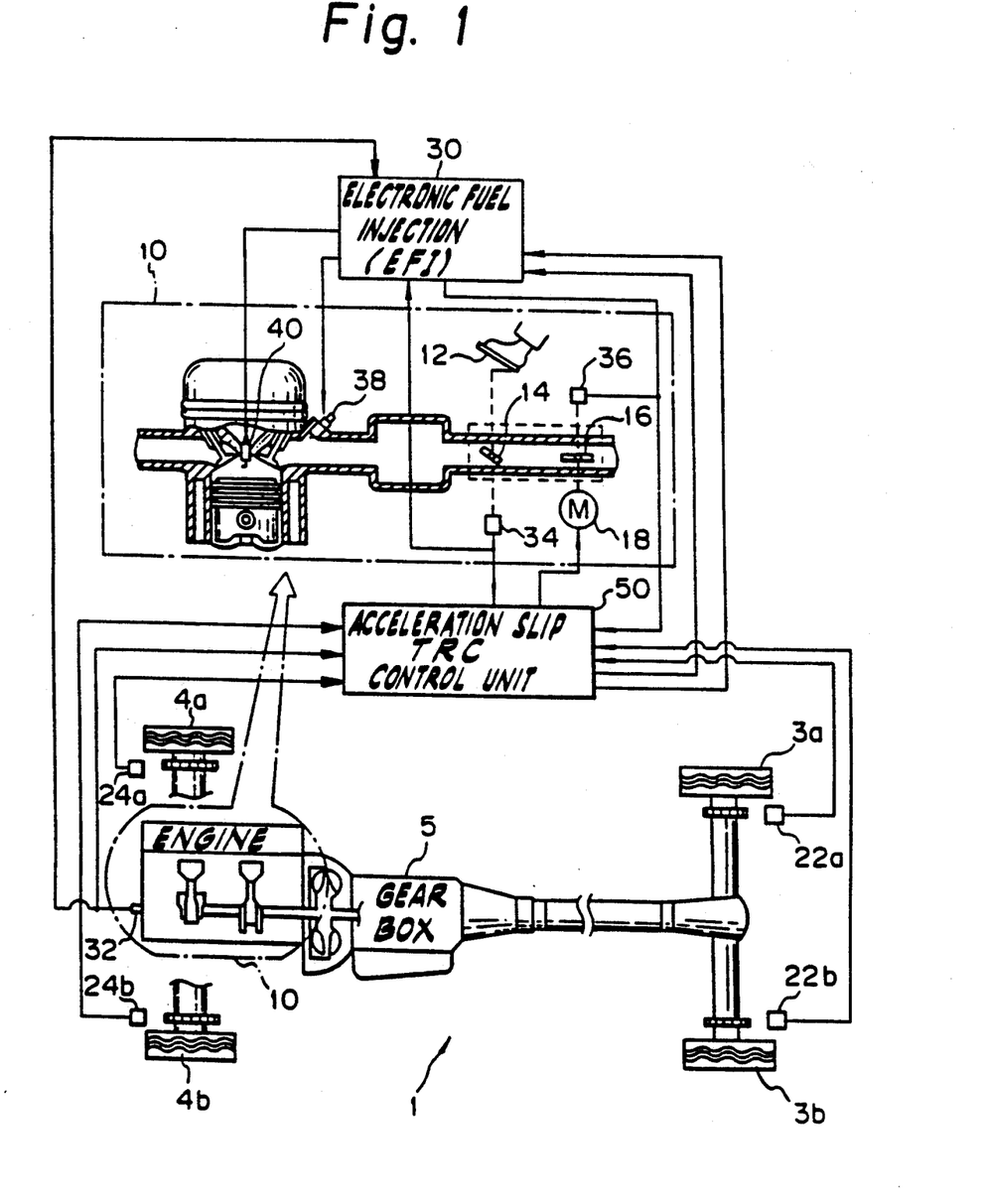
FIG. 1 is a schematic view of a vehicle fitted with an acceleration slip control device of the present invention.

FIG. 1 illustrates an embodiment of the acceleration slip control device according to the present invention.

Referring to FIG. 1, reference numeral 1 represents a vehicle, 10 denotes an engine mounted on the vehicle 1, 3a, 3b represent driving wheels of the vehicle 1 to which a driving torque is transmitted from the engine 10 through a gear box 5, and 4a, 4b represent driven wheels of the vehicle 1. Wheel speed sensors 22a, 22b, 24a, 24b, which detect the speed of rotation of the wheels, are provided at the driving wheels 3a, 3b and the driven wheels 4a, 4b, of the vehicle 1, respectively.

Numeral 14 denotes a main throttle valve disposed in the inlet air passage of the engine 10, for adjusting an inlet air flow in accordance with the amount of depression of an accelerator pedal 12 by a driver.

In this embodiment, separately from the main throttle valve 14, a subthrottle valve 16 is disposed in the inlet air passage upstream of the main throttle valve 14. The subthrottle valve 16 is driven by an actuator such as a stepper motor 18, and can be actuated independently from the main throttle valve 14.

Numeral 30 denotes a fuel injection control unit (hereinafter called "EFI unit") which controls the amount of fuel injected and the ignition timing of the engine 10. The EFI unit 30 is a known type digital computer which includes a CPU (central processing unit), a ROM (read only memory), a RAM (random access memory), and input and output terminals. In the performance of these control procedures, an engine speed signal is input from an engine speed sensor 32 to the EFI unit 30, and signals representing a degree of opening of the main throttle valve 14 and the subthrottle valve 16 are input from opening angle sensors 34 and 36 respectively. Although not shown in the drawing, other signals required for various control procedures are input from corresponding sensors. The EFI unit 30 is connected to fuel injection valves 38 and ignition plugs 40 via an appropriate driving circuit (not shown), and controls the amount of fuel injected and the ignition timing of the engine 10.

Numeral 50 is a control unit 50 which performs an acceleration slip control according to the present invention. The control unit 50 (hereinafter called "TRC unit") is also a known type of digital computer having a construction similar to that of the EFI unit 30.

To perform the acceleration slip control, the speed of rotation of each wheel 3a, 3b, 4a, 4b is input to the TRC unit 50 from the wheel speed sensors 22a, 22b, 24a, 24b, respectively. Also, the engine speed signal, and signals representing a degree of opening of the main throttle valve 14 and the subthrottle valve 16, are input to the TRC unit from the engine speed sensor 32 and opening angle sensors 34, 36 respectively.

The TRC unit 50 is connected to the stepper motor 18 of the subthrottle valve 16 to control the opening thereof. Further, the TRC unit 50 is connected to the EFI unit 30 and feeds signals thereto for initiating a fuel cut operation and an ignition timing retard operation thereby.

In this embodiment, the opening of the subthrottle valve 16 is PID (proportional integral and derivative) controlled on the basis of the deviation of the speed of rotation of the driving wheels from the target speed, and as explained later, the proportional factors used in the control characteristic equation are changed in accordance with the value of the friction coefficient between the driving wheels and the road surface.

The friction coefficient between the driving wheels and the road surface (hereinafter called "the friction coefficient" or "$\mu$") is calculated from the acceleration of the vehicle under a predetermined condition.

Namely, the TRC unit measures the time t required for increasing the driven wheel speed by a predetermined amount (i.e., b km/h) when the slipping of the driving wheels is controlled, and calculates the acceleration $\alpha$ of the vehicle using the formula $\alpha = b/t$.

If the weight of the vehicle is known, the drive force F generated by the driving wheels is obtained from the acceleration $\alpha$ using the formula $F = W \cdot \alpha/g$; where g denotes the acceleration of the gravity. Also, the drive force F generated by the driving wheels is expressed as $F = W_r \mu$, using the load $W_r$ exerted on the driving wheels and the friction coefficient. Therefore, the friction coefficient $\mu$ is calculated as $\mu = F/W_r = (W/g \cdot W_r) \cdot \mu$.

As explained before, when calculating the friction coefficient from the acceleration of the vehicle, sometimes the value of the calculated friction coefficient does not coincide with the actual value due to an error in detecting the driven wheel speed, and other reasons.

Therefore, in this embodiment, the TRC unit examines the reliability of the calculated value of the friction coefficient by comparing it with the amount of deviation of the driving wheel speed from the target speed, and determines whether or not the calculated value can be used for the acceleration slip control.

Namely, if the value of the calculated friction coefficient is higher than the value presently used for the control, the TRC unit uses the calculated value for the control only when the amount of the deviation is smaller than a predetermined value. This is because, when the amount of the deviation is maintained within a predetermined value by the acceleration slip control, the amount of the deviation must be increased if the friction coefficient becomes higher. Consequently, if the amount of the slip becomes higher than the predetermined value, despite the increased value of the friction coefficient, it is considered that the calculated friction coefficient includes an error.

Conversely, if the value of the calculated friction coefficient is lower than the value presently used, the TRC unit uses the calculated value for the control only when the amount of the deviation is larger than a predetermined value.

By examining the value of the calculated friction coefficient in the manner explained above, the effect of an error in the calculated friction coefficient can be eliminated from the acceleration slip control.

Figures 2, 2A:
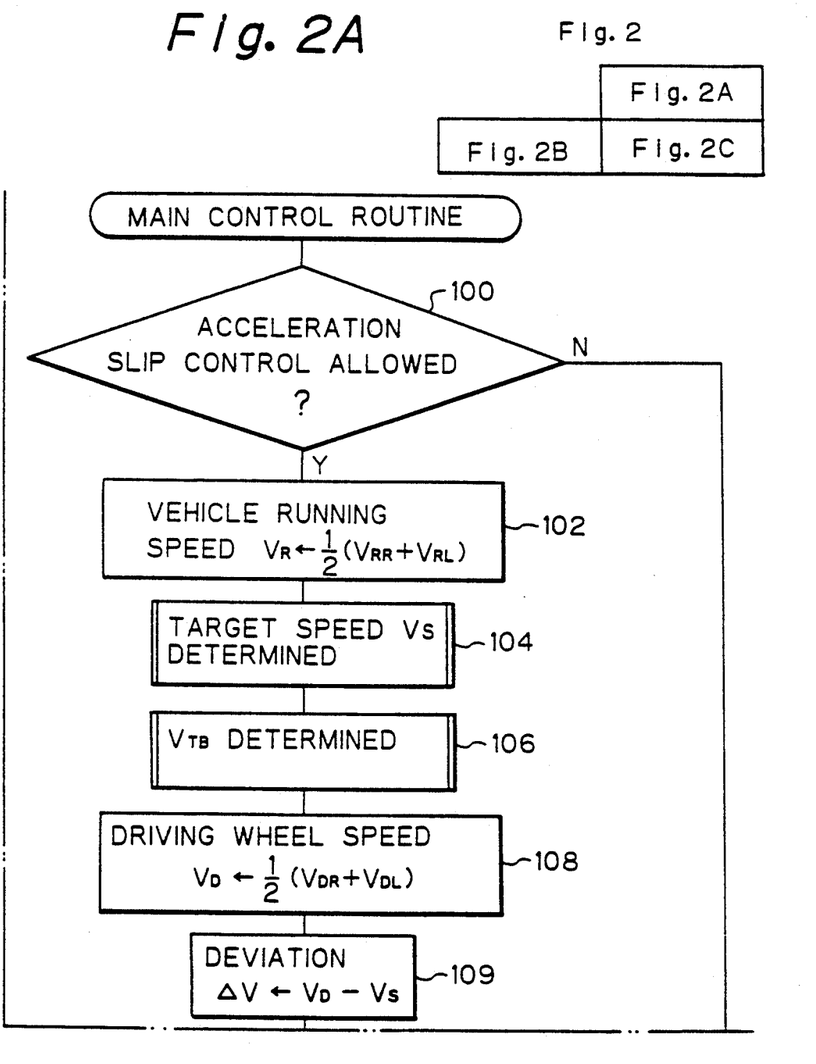
FIG. 2 through FIG. 4 are flow charts of the control routines of an embodiment of the acceleration slip control device of the present invention.
Figure 2B:
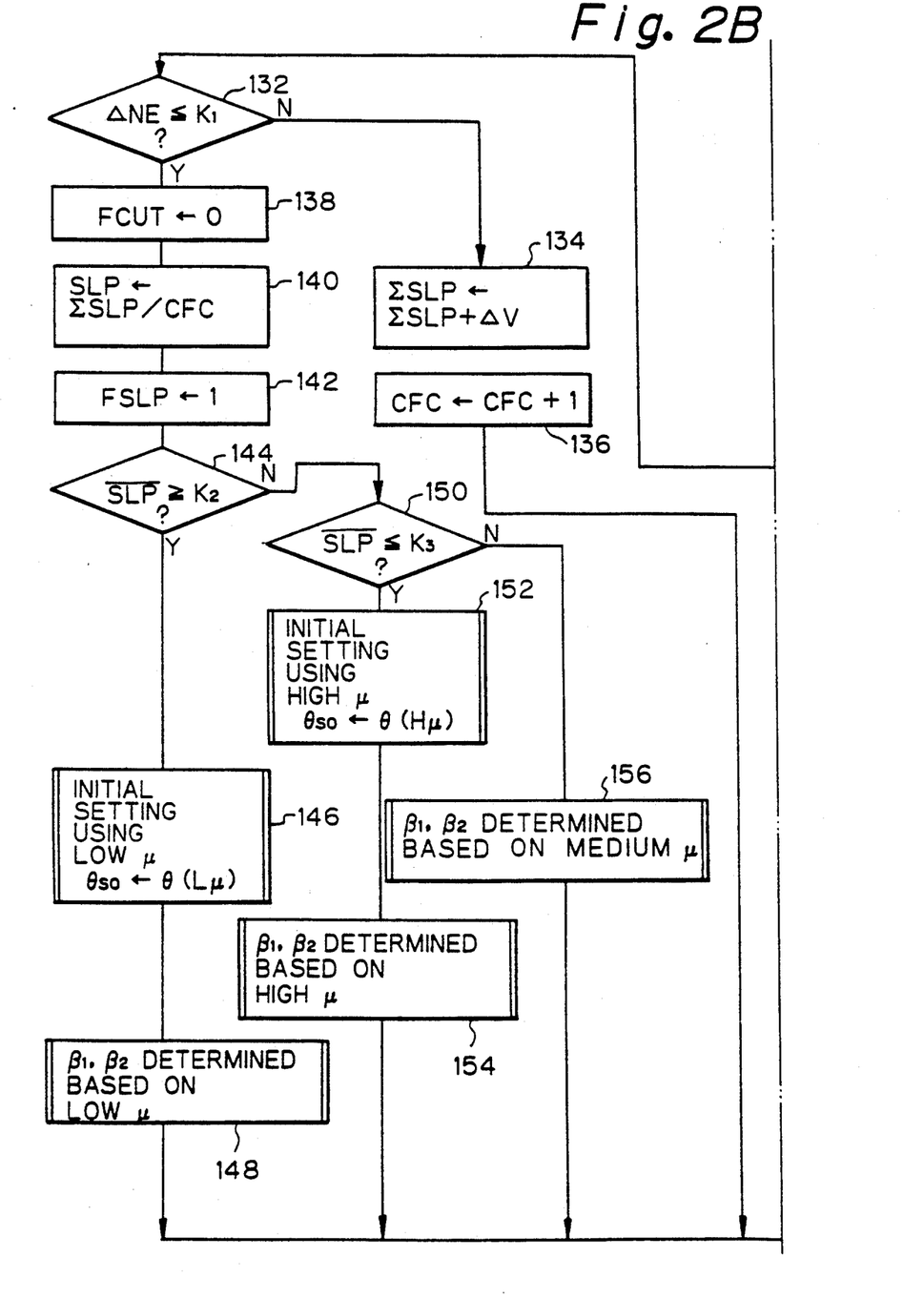
Figure 2C:
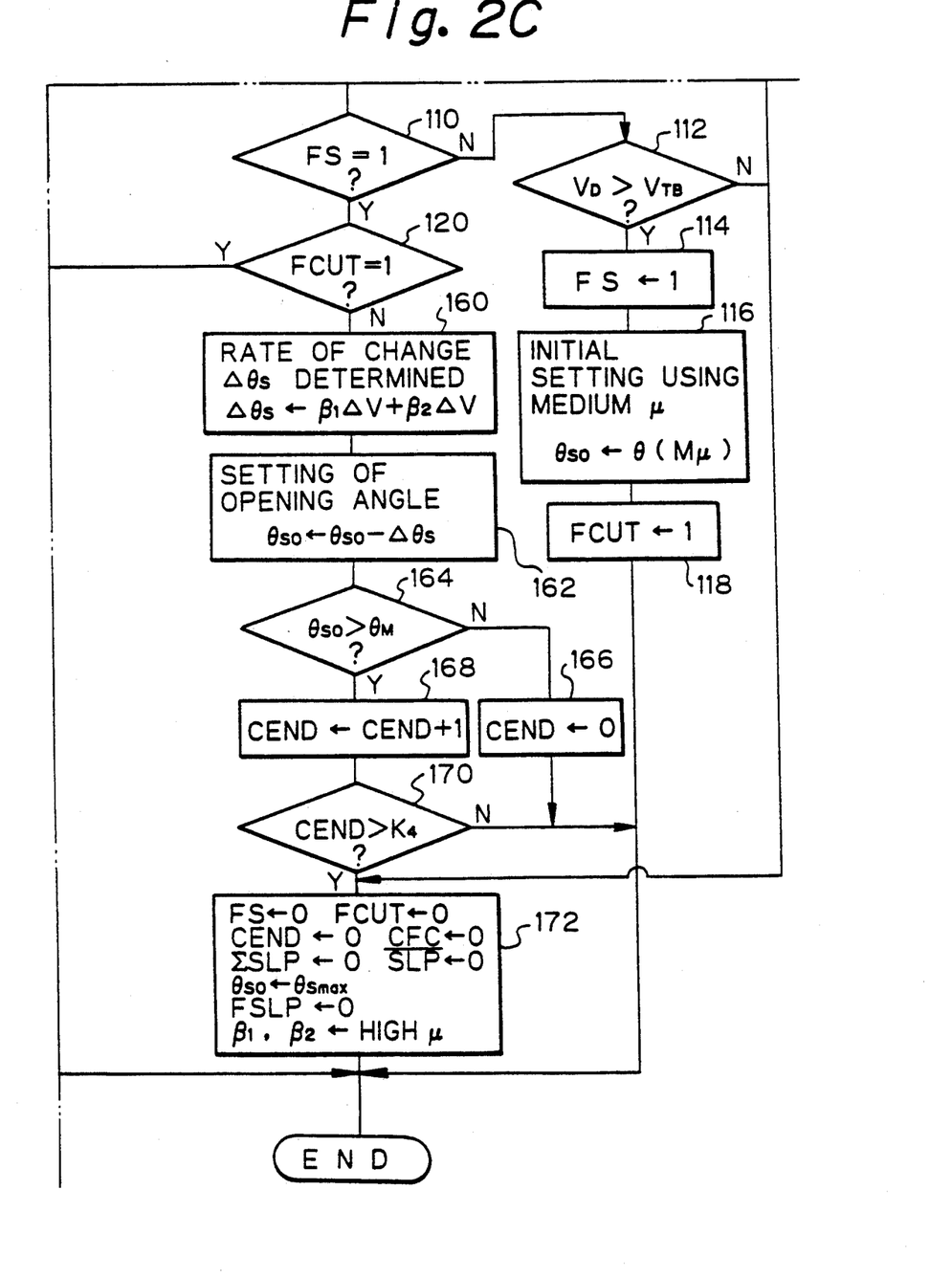
Figure 3:
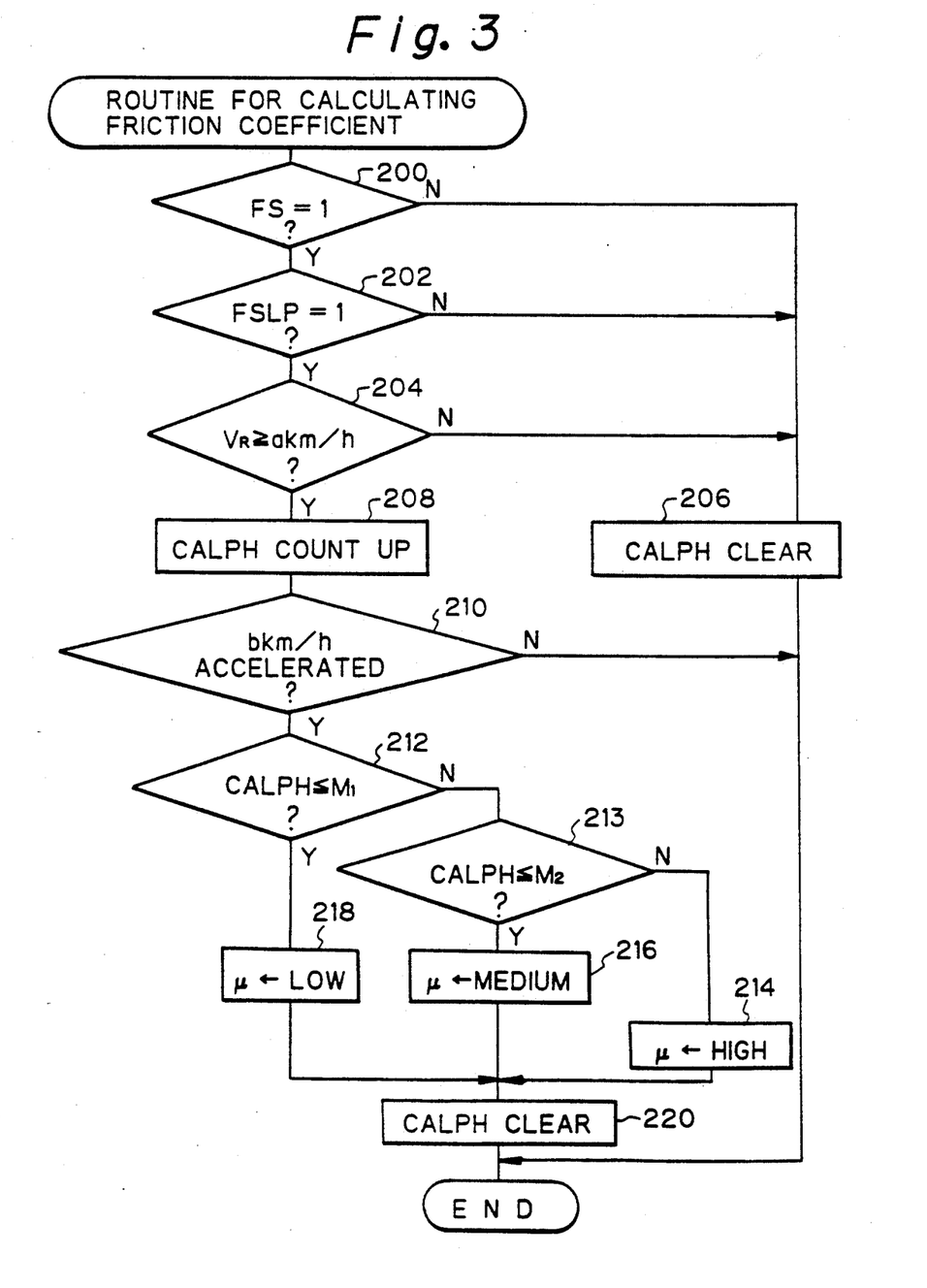
Figure 4:
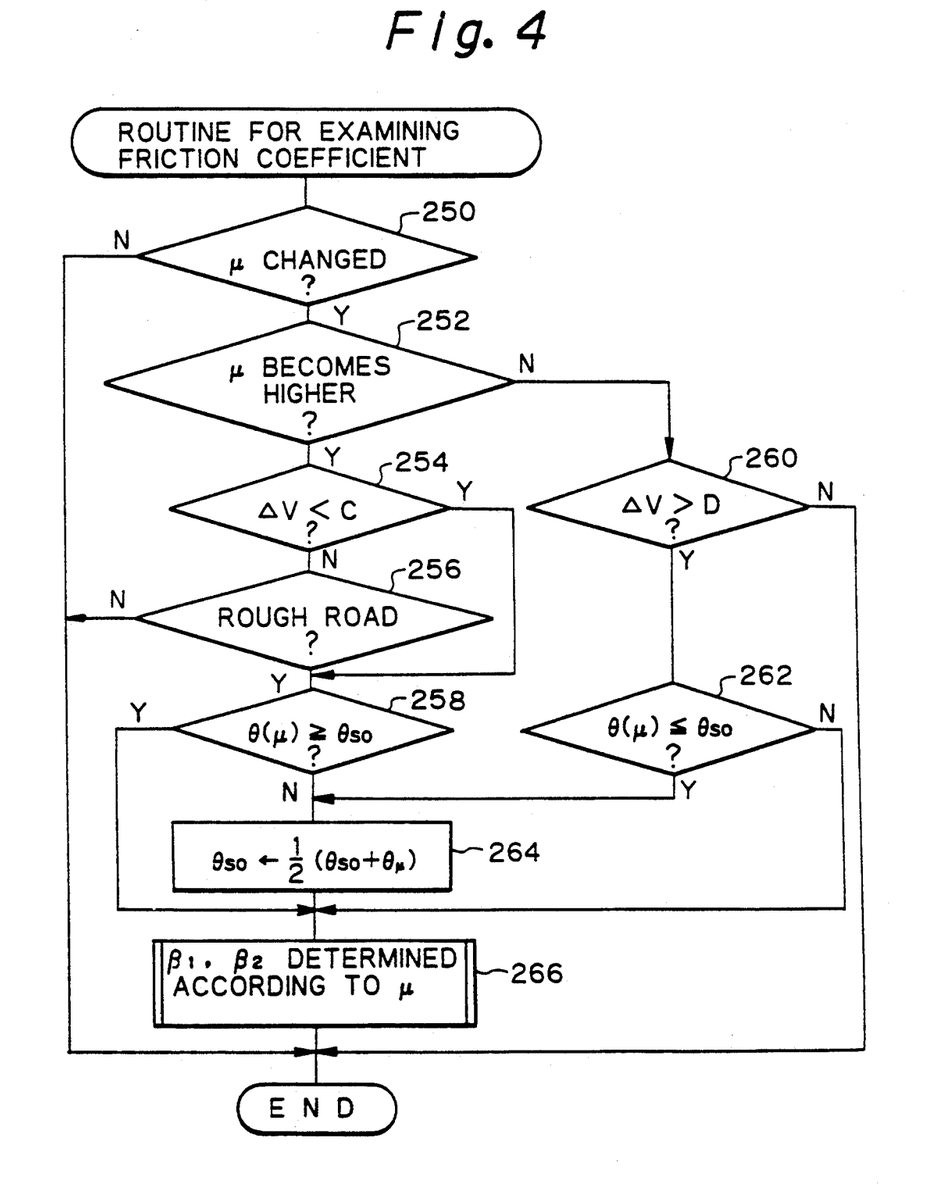

The detail of the acceleration slip control of the embodiment is now explained using the flow charts shown in FIGS. 2 through 4.

FIG. 2 illustrates a main control routine of the acceleration slip control. This routine is processed by the TRC unit 50 by sequential interruptions at predetermined intervals (e.g., 12 msec).

Referring to FIG. 2, in step 100, it is determined whether the conditions permitting an acceleration slip control are satisfied. In this embodiment, the acceleration slip control is allowed only when both of the following conditions are satisfied:

(a) the opening angle $\theta_M$ of the main throttle valve is not fully closed;
(b) all of the related sensors are operating correctly.

If either of the above conditions is not satisfied, the routine proceeds to step 172 in which all the flags are reset and the opening angle $\theta_{SO}$ of the subthrottle valve is set at $\theta_{Smax}$ (fully open condition), and the routine is then terminated.

If the above conditions are satisfied in step 100, then steps 102 to 109 are executed. In step 102, the running speed of the vehicle is calculated as a mean value of the rotating speeds $V_{RR}$ and $V_{RL}$ of the right and the left driven wheels of the vehicle 4a and 4b, and then the target speed $V_S$ of the driving wheels 3a and 3b is determined from the value $V_R$ in step 104.

In this embodiment, $V_S$ is calculated by the following formulas.

(a) When $V_R \leq 30$ km/h $$V_S = V_R + 2.4 \text{ km/h}$$

(b) When 30 km $< V_R \leq 100$ km/h $$V_S = 1.08 \cdot V_R \text{km/h}$$

(c) When $V_R > 100$ km/h $$V_S = 1.08 \cdot V_R \text{ km/h or } V_S = V_R + 10 \text{ km/h}$$

whichever is smaller.

The target speed $V_S$ is always made larger than the vehicle speed $V_R$, to obtain a predetermined slippage between the driving wheels and a road surface.

As shown by the formulas (a)–(c), when the vehicle speed is low a slip rate $(V_S - V_R)/V_R$ is made relatively large to thus improve the acceleration of the vehicle, but when the vehicle speed is high, the slip rate is made small to improve the straight line stability.

After determining the target speed, in step 106, a speed $V_{TB}$ is determined. The speed $V_{TB}$, which represents the speed at which the acceleration slip control is started, is calculated by $V_{TB} = V_S + B$, where B is a predetermined constant which is set between 2.0 km/h –4.0 km/h according to the type of vehicle and the road condition. The constant B is used for setting $V_{TB}$ sufficiently higher than $V_S$ that a frequent acceleration slip control operation is thereby prevented. Then, in step 108, the speed of rotation of the driving wheels $V_D$ is determined as a mean value of the rotating speeds $V_{DR}$, $V_{DL}$ of the right and the left driving wheels 3a, 3b of the vehicle. After determining $V_D$, in step 109 the deviation $\Delta V$ is calculated by $\Delta V = V_D - V_S$ (rotating speed of the driving wheel minus the target speed).

Then, in step 110, it is determined whether a flag FS is set. The flag FS indicates whether or not the acceleration slip control has been started. When FS = 0, which means that the acceleration slip control has not been started, the routine proceeds to step 112. In step 112, it is determined whether or not the acceleration slip control should be started. This is determined by comparing the driving wheel speed $V_D$ with the control starting speed $V_{TB}$, and when $V_D \leq V_{TB}$, the routine proceeds to step 172 in which all the flags are reset and subthrottle valve is fully opened.

In step 112, if $V_D > V_{TB}$, then the flag FS is set in step 114, and the opening angle of $\theta_{SO}$ of the subthrottle valve is set at an initial setting value in step 116. The initial setting value of $\theta_{SO}$ is determined by the engine speed NE and the friction coefficient $\mu$. In this embodiment, the value of the friction coefficient is represented by three levels according to the magnitude, i.e., a high (H$\mu$), a medium (M$\mu$) and a low (L$\mu$), and initial setting values are stored in the ROM in the TRC unit in the form of a map of the engine speed and the level of the friction coefficient. The initial setting value of $\theta_{SO}$ increases as the engine speed NE increases, assuming the same friction coefficient level exists, and increases as the friction coefficient level becomes higher, assuming the same engine speed NE exists.

The reason for setting the opening angle of the subthrottle valve at the initial setting value before starting the feedback control is that, since the subthrottle valve is maintained in the fully open condition before the control is started, if the feedback control of the subthrottle valve is started from this position, a relatively long time is required for closing the subthrottle valve to a required opening angle. Therefore, to improve the response, it is necessary to set the opening angle of the subthrottle valve at an appropriate position before starting the feedback control.

In step 116, the initial setting value is provisionally determined on the basis of a medium level friction coefficient and the opening angle of the subthrottle valve $\theta_{SO}$ is set at $\theta_{(M\mu)}$. When $\theta_{SO}$ is set in step 116, the stepper motor 18 actuates the subthrottle valve 16 until the opening angle $\theta_{SO}$ is obtained, and when the initial setting of the subthrottle valve is completed, a flag FCUT is set in step 118, and the routine is then terminated.

The flag FCUT indicates the request for an initial fuel cut operation. The initial fuel cut operation is a fuel cut performed once immediately after the start of the acceleration slip control, to reduce the engine speed. When the flag FCUT is set, the EFI unit 30 carries out the fuel cut operation, and this fuel cut operation is continued until the flag FCUT is reset.

Returning to step 110, if the flag FS is set, since this means that step 112 through 118 are already completed, the routine proceeds to step 120 and it is determined whether the flag FCUT is set. If FCUT = 1, this means that the initial fuel cut operation started in step 118 is still continued, and then in step 132 it is determined whether or not the initial fuel cut operation should be terminated. The initial fuel cut is terminated when the rate of increase of the engine speed $\Delta$NE becomes less than or equal to a predetermined value $K_1$ (e.g., $K_1 = 1000$ rpm/sec), namely, the initial fuel cut operation is terminated when the effect of the fuel cut operation appears as a reduction in the rate of increase of the engine speed.

If the condition for terminating the initial fuel cut operation is not satisfied in step 132, then a cumulative value $\Sigma$SLP of the deviation $\Delta V$ is calculated in step 134, and a counter CFC, which indicates the number of times of the cumulation is carried out in step 134, is counted up in step 136, and the routine is then terminated.

If the above condition is satisfied in step 132, the initial fuel cut is terminated in step 138 by resetting the flag FCUT. Then, in step 140 a mean value SLP of the deviation is calculated from the cumulative value $\Sigma$SLP obtained in step 134, and a flag FSLP is set in step 142. The flag FSLP indicates whether or not the calculation of mean value SLP has been completed.

Steps 144 through 156 show the procedure for correcting the initial setting value of the opening angle $\theta_{SO}$ of the subthrottle valve determined in step 116.

As explained above, the initial setting value is provisionally determined on the basis of medium level friction coefficient, and is not based on the actual condition of the road surface. Therefore, in this embodiment, the initial setting value is corrected before starting a feedback control, in accordance with the magnitude of the friction coefficient $\mu$ determined from the mean value SLP of the deviation $\Delta V$. The deviation $\Delta V$ is defined as the difference between the speed of rotation of the driving wheels $V_D$ and the target speed $V_S$. The target speed $V_S$ is determined in accordance with the running speed $V_R$ of the vehicle, and the amount of the slippage between the driving wheels and the road surface is calculated as the difference between the speed of rotation $V_D$ of the driving wheels and the running speed $V_R$ of the vehicle. Therefore, the value $\Delta V$ corresponds to the amount of the slippage of the driving wheels. Consequently, the friction coefficient $\mu$ can be determined from the mean value SLP of the deviation $\Delta V$ measured under a predetermined condition (i.e., under the initial fuel cut operation).

Namely, in step 144, if SLP is larger than or equal to a predetermined value $K_2$ it is determined that the friction coefficient is low, since a large amount of slippage occurs between the driving wheels and the road surface. Then the initial setting value of the opening angle $\theta_{SO}$ of the subthrottle valve is corrected to the value corresponding to a low level friction coefficient, in step 146, and proportional factors $\beta_1$, $\beta_2$ are selected on the basis of a low friction coefficient in step 148. If SLP is smaller than $K_2$ in step 144, then it is determined whether SLP is smaller than or equal to another predetermined value $K_3$. If SLP is smaller than or equal to $K_3$, it is determined that the friction coefficient is high, and then the initial setting value for $\theta_{SO}$ is corrected to a value corresponding to a high level friction coefficient (step 152), and $\beta_1$ and $\beta_2$ are selected on the basis of a high level friction coefficient. If the value of SLP is between $K_2$ and $K_3$, then $\theta_{SO}$ set in step 116 is not changed, and only $\beta_1$ and $\beta_2$ are selected on the basis of a medium level friction coefficient (step 156).

Returning to step 120, if FCUT=0, which means that steps 132 to 156 have been completed, then a feedback control is carried out in steps 160 and 162. Namely, in step 160 the rate of change $\Delta\theta_S$ of the opening angle of the subthrottle valve is determined by the formula: $\Delta\theta_S = \beta_1 \cdot d\Delta V/dt + \beta_2 \Delta V$. Where $\Delta V$ is the deviation calculated in step 119, and $d\Delta V/dt$ is the rate of change of the deviation calculated by the formula: $d\Delta V/dt = \Delta V_{(n)} - \Delta V_{(n-1)} \cdot \Delta V_{(n)}$ is the value of the deviation when the routine this time, and $\Delta V_{(n-1)}$ is the same when the routine was executed last time.

$\beta_1$ and $\beta_2$ are proportional factors related in accordance with the level of the friction coefficient.

Then, in step 162 the setting value $\theta_{SO}$ is determined by subtracting $\Delta\theta_S$ from the present setting value of the opening angle of the subthrottle valve, and the value $\theta_{SO}$ is then output to the stepper motor 18.

Steps 164 to 170 show the process for determining the conditions for terminating the acceleration slip control.

In this embodiment, the acceleration slip control is terminated when a condition in which the opening angle $\theta_{SO}$ of the subthrottle valve becomes larger than the opening angle $\theta_M$ of the main throttle valve (step 164) continues for more than a predetermined time (step 170).

When terminating the control, in step 172 all the flags are reset and the opening angle $\theta_{SO}$ of the subthrottle valve is set at $\theta_{Smax}$ (fully open condition).

FIG. 3 shows a routine for determining the friction coefficient between the driving wheels and the road surface. This routine is processed by the TRC unit by sequential interruptions at predetermined intervals.

The determination of the friction coefficient $\mu$ is carried out when all of the following conditions are satisfied:

(a) The acceleration slip control has been started (FS =1 in step 200);

(b) The initial fuel cut operation has been completed (FSLP =1 in step 202);

(c) The running speed of the vehicle is greater than or equal to a predetermined value a (in this embodiment, a =3 km/h) (step 204).

The friction coefficient is determined, when all of the above conditions are satisfied, by measuring the time (CALPH) required for increasing the running speed of the vehicle by b km/h (in this embodiment, b =1.25 km/h) (step 210, 212). As explained above, the friction coefficient $\mu$ is expressed as $\mu = (W/g \cdot W_r) \cdot \alpha = K_6 \cdot \alpha$ (W: weight of the vehicle, $W_r$: load exerted on the driving wheels, g: the acceleration of the gravity, and $\alpha$: an acceleration of the vehicle, $K_6$: constant). Where, if T sec is required for increasing the running speed of the vehicle by b km/h, the acceleration of the vehicle $\alpha$ is calculated by $\alpha = K_5 \cdot b/T$. Therefore, the friction coefficient $\mu$ can be expressed as $\mu = (K_6 \cdot K_5 \cdot b)/T = K_7/T$, and thus the friction coefficient can be determined from the time CALPH. In this embodiment, the friction coefficient $\mu$ is classified into three levels according to magnitude, i.e., a high (H$\mu$), a medium (M$\mu$) and a low (L$\mu$) (steps 212 to 218), and the acceleration slip control is carried out on the basis of the level of the friction coefficient.

FIG. 4 shows the routine for determining the reliability of the value of the friction coefficient obtained by the routine in FIG. 3. This routine is also processed by the TRC unit by sequential interruptions at predetermined intervals.

At start of the routine, in step 250 it is determined whether the value of the friction coefficient $\mu$ calculated by the routine in FIG. 3 is different from the value of the same now used for the control.

If the values of the friction coefficient are the same, the routine is terminated without processing steps 252 to 266.

If the values of $\mu$ are different in step 250, in step 252 it is determined whether the value of $\mu$ calculated by the routine in FIG. 3 is higher than the value now used for the control, and if so, then, in step 254 it is determined whether the deviation $\Delta V$ of the driving wheels is smaller than a predetermined value C (In this embodiment, the predetermined value C is set at C =2.5 km/h). As explained above, since the drive torque of the driving wheels is feedback controlled, if the friction coefficient is increased, the deviation $\Delta V$ must decrease. Therefore, if the deviation $\Delta V$ is still larger than the predetermined value C (i.e., $\mu V$ does not decrease while $\mu$ becomes higher), the routine proceeds to step 256 and it is determined whether the vehicle is running on a rough road. If the vehicle is not running a rough road, then it is determined that the calculated value of $\mu$ is not reliable and the routine is terminated without changing the value of $\mu$ now used for the control. If the vehicle is running on a rough road, it is determined that the calculated value of $\mu$ can be used for the control even if the deviation has not decreased. This is because, on a rough road, the value of the deviation $\Delta V$ changes widely due to the rough condition of the road surface, and thus it is not appropriate to determine the reliability of the value of $\mu$ by the magnitude of the deviation $\Delta V$.

The determination of whether or not the vehicle is running on a rough road is carried out on the basis of a range of variations of the deviation $\Delta V$, by a routine not shown here.

Thus, if $\Delta V < C$ in step 254, or if the vehicle is running on a rough road, the routine proceeds to step 258.

In step 258 the initial setting value $\theta(\mu)$ is again determined in accordance with a new $\mu$ value, and it is determined whether $\theta(\mu)$ is larger than or equal to the present setting of the opening angle $\theta_{SO}$ of the subthrottle valve, and if $\theta(\mu)$ is larger than or equal to $\theta_{SO}$, the setting $\theta_{SO}$ is increased to the mean value of $\theta(\mu)$ and $\theta_{SO}$ in step 264. Since the opening angle $\theta_{SO}$ of the subthrottle valve is brought close to the initial setting value $\theta(\mu)$, based on the lower friction coefficient, the opening angle $\theta_{SO}$ must be increased to an angle close to the initial setting value based on a higher friction coefficient, but if this increase of the opening angle is carried out by a feedback control (in step 160 and 162 in FIG. 2), it takes a long time and thus adversely affects the response of the control. Therefore, in this embodiment, if a change occurs in the value of the friction coefficient $\mu$ used for the control, the setting of the opening angle $\theta_{SO}$ of the subthrottle valve is adjusted so that the feedback control of the subthrottle valve can be started from a position suitable for the friction coefficient level.

In step 258, if $\theta(\mu)$ is smaller than $\theta_{SO}$, since the feedback control can be started without changing the setting of $\theta_{SO}$, only the proportional factors $\beta_1$ and $\beta_2$ used for the control are changed to values corresponding to the new friction coefficient.

The reason for setting $\theta_{SO}$ at the mean value of $\theta(\mu)$ and present value of $\theta_{SO}$ is to prevent sudden changes of the control characteristics.

If the value of $\mu$ calculated by the routine in FIG. 3 is lower than the value now used for the control, similar discriminations are carried out in steps 260 and 262, and steps 264 and 266 are executed if necessary (In this embodiment, the predetermined value D is set at D = 5 km/h).

According to the embodiment explained above, the friction coefficient is determined from the acceleration of the vehicle, and classified into three levels according to magnitude.

The feedback control of the opening angle of the subthrottle valve is carried out on the basis of these levels of the friction coefficient, and if the value of the friction coefficient changes, it is determined whether this value of the friction coefficient can be used for the control. If this value of the friction coefficient can be used for the control, the setting of the opening angle of the subthrottle valve is adjusted according to the new value of the friction coefficient.

Therefore, when the road condition changes, the feedback control starts from the position of the subthrottle valve corresponding to the value of the friction coefficient suitable for the road condition, and thus the response of the control is improved.

Also, the reliability of the value of the friction coefficient is determined before using that value for the control, and thus errors due to the use of an improper friction coefficient value can be eliminated.

Another embodiment of the present invention is now explained.

In the above embodiment, the target speed $V_S$ of the driving wheels is determined in accordance with the running speed $V_R$ of the vehicle only, regardless of the road condition, but if the friction coefficient $\mu$ is low, preferably the target speed $V_S$ is made close to the running speed $V_R$, to thereby improve the straight line stability by reducing the slippage between the driving wheels and the road surface. Conversely, if the friction coefficient is high, preferably the target speed $V_S$ is set higher, to thereby improve the acceleration. Therefore, preferably the target speed $V_S$ is determined according to the magnitude of the value of the friction coefficient $\mu$.

In this embodiment, the target speed $V_S$ is determined in the form of $V_S = A \cdot V_R$, and the value of the constant A is selected according to the level (i.e., high, medium, low) of the value of the friction coefficient, in such a manner that a larger value is selected for a higher level of the friction coefficient. The value of the constant A is renewed when a new value for the friction coefficient is used by the routine in FIG. 4. Other control routines of this embodiment are similar to the routines shown in FIGS. 2 to 4, and therefore, a further explanation thereof is omitted.

According to this embodiment the straight line stability is improved when the vehicle is running on a road having a low friction coefficient, and the acceleration is improved when the vehicle is running on a road having a high friction coefficient.

A third embodiment of the present invention is now explained with reference to FIGS. 5 and 6. While the magnitude of the friction coefficient is classified into three levels (high, medium, low) in the preceding embodiments, the friction coefficient is calculated and used as a continuous value in this embodiment.

Figure 5:
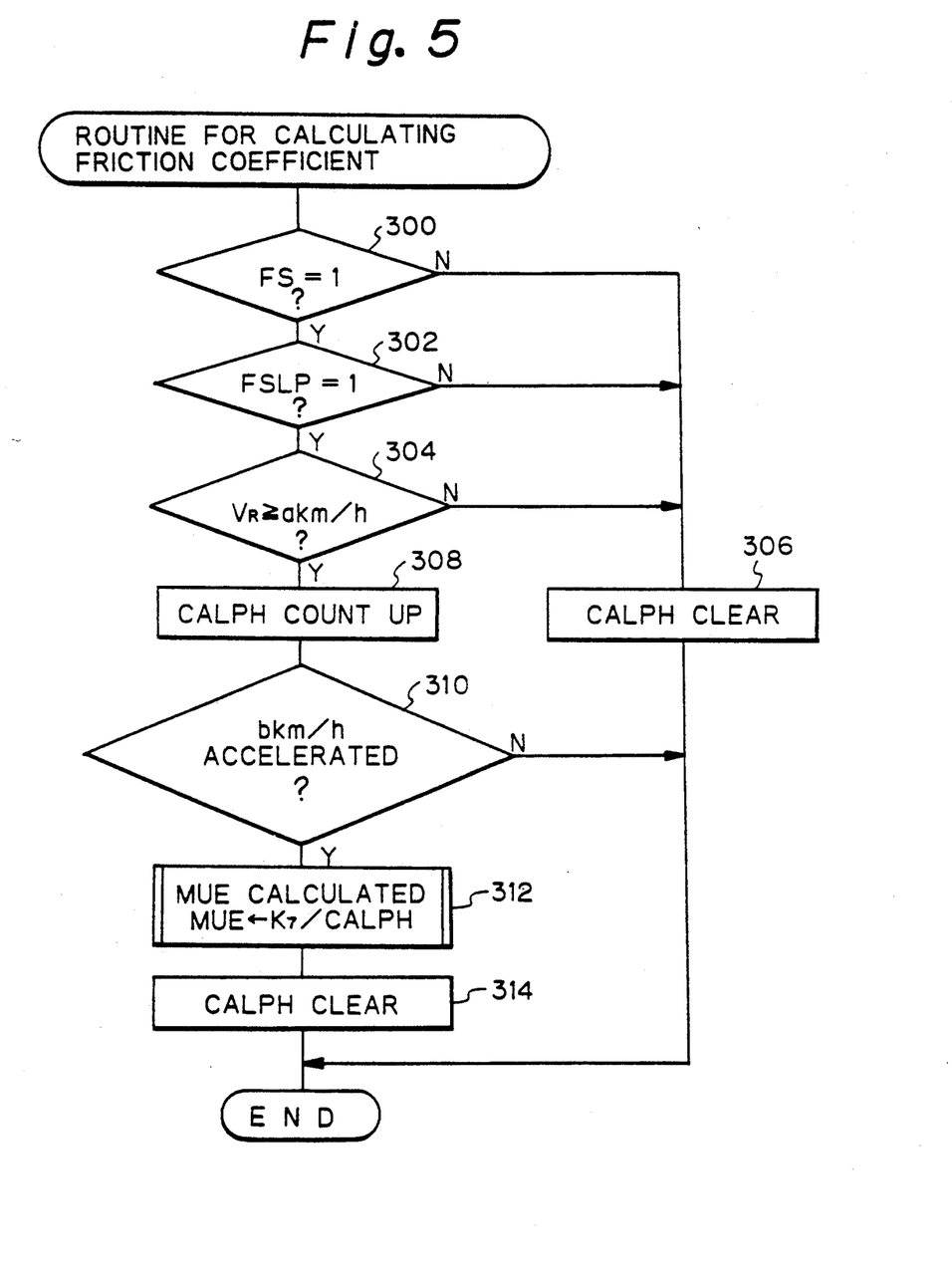
FIG. 5 and FIG. 6 are flow charts of the control routines of another embodiment of the acceleration slip control device of the present invention.

FIG. 5 shows a routine for calculating the friction coefficient as a continuous value.

The step 300 to 310 in FIG. 5 are same processes as steps 200 to 210 in FIG. 3, in which the time CALPH required for accelerating the vehicle by b km/h (b = 1.25 km/h) is measured. In step 312, continuous value MUE for the friction factor is calculated by MUE = $K_7$/CALPH ($K_7$:Constant)

Figure 6:
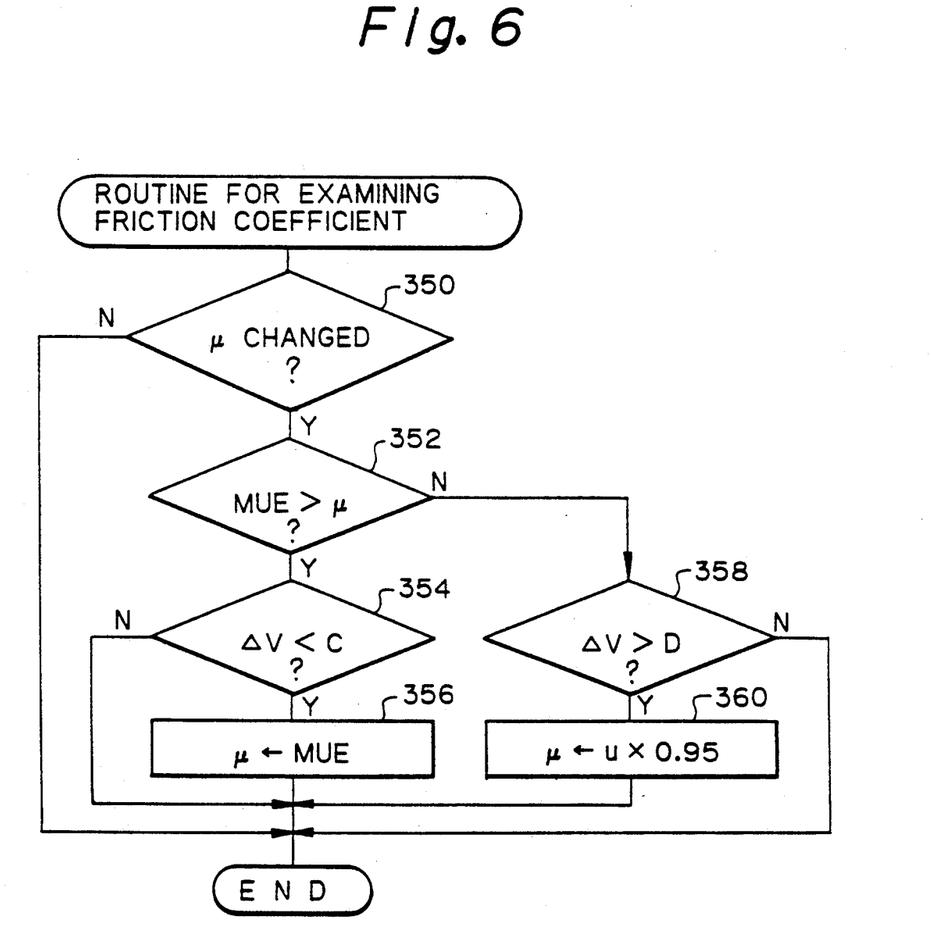

FIG. 6 shows a routine for examining the reliability of the calculated value MUE of the friction coefficient.

The steps 350 to 354 and 358 in FIG. 6 are processes similar to the steps 250 to 254 and 260 in FIG. 3, in which it is determined whether or not the calculated value MUE is different from the value of the friction coefficient now used in the control, (step 350), and the reliability of the value MUE is determined (steps 352, 354 and 356). When the value MUE is determined to be reliable, then that value MUE is used for the control. In this embodiment, however, the new value of the friction coefficient used for the control is set at 0.95 times the present value of the friction coefficient, when the calculated value MUE is lower than the present value of the friction coefficient (step 360).

When the calculated value MUE is higher than the present value, the value MUE is used as the new value for the friction coefficient in the control (step 356).

Also, in this embodiment, the initial setting $\theta_{SO}$ of the opening angle of the subthrottle valve is not re-adjusted and only the proportional factors $\beta_1$, $\beta_2$ are changed according to the value of the friction coefficient, to thereby improve the response of the control. The reason for not re-adjusting $\theta_{SO}$ (as shown in FIG. 4, step 264) is, because the value of the friction factor is changed continuously, the setting value $\theta_{SO}$ is also changed continuously, and thus the discrete change of the setting value $\theta_{SO}$ does not occur even when the value of the friction coefficient changes.

In the embodiments explained above, the value of the deviation $\Delta V$ at the execution of the routine is used for determining the reliability of the calculated friction coefficient (step 254 in FIG. 4, step 354 in FIG. 6). However, also a mean value $\overline{\Delta V}$ of the deviation $\Delta V$ during the acceleration (step 210 in FIG. 3, step 310 in FIG. 5) may be used for determining the reliability of the calculated friction coefficient.

As explained above, according to the present invention, the friction coefficient is calculated from the acceleration of the vehicle, and the calculated friction coefficient is used for the acceleration slip control only when it is determined to be reliable. Consequently, an accurate control based on the actual condition of the road surface can be obtained, and the adverse effects of noise and errors eliminated.

We claim:

1. An acceleration slip control device for controlling a slippage between driving wheels of the vehicle and a road surface during an acceleration of the vehicle, comprising:
- a target speed setting means for determining a target speed according to a running speed of the vehicle;
- a deviation detecting means for detecting a deviation which is defined as a difference between a rotating speed of the driving wheels and said target speed;
- a friction coefficient detecting means for detecting a friction coefficient between the driving wheels and the road surface;
- a control means for controlling a driven torque of the driving wheels on the basis of the magnitude of said deviation and said friction coefficient in such a manner that the rotating speed of the driving wheels coincides with said target speed; and
- a reliability determining means for determining the reliability of the value of a currently detected friction coefficient by comparing the value of said currently detected friction coefficient with the magnitude of said deviation detected by said deviation detecting means, wherein said reliability determining means determines that said currently detected friction coefficient is unreliable when the magnitude of said deviation is greater than a predetermined value and said currently detected friction coefficient is greater than a previously detected friction coefficient, said reliability determining means prohibiting said control means from using said currently detected friction coefficient for the control when said currently detected friction coefficient is determined to be unreliable.

2. An acceleration slip control device according to claim 1, wherein said reliability determining means determines said currently detected friction coefficient to be unreliable when the magnitude of said deviation is less than the predetermined value and said currently detected friction coefficient is lower the previously detected friction coefficient.

3. An acceleration slip control device according to claim 1, wherein said friction coefficient detecting means comprises an acceleration detecting means for detecting an acceleration of the vehicle, and a means for calculating the friction coefficient between the driving wheels and the road surface on the basis of said detected acceleration.

4. An acceleration slip control device according to claim 3, wherein said acceleration detecting means detects the acceleration of the vehicle by measuring a time required for increasing the running speed of the vehicle by a predetermined amount after the acceleration slip control is started.

5. An acceleration slip control device according to claim 1, wherein said friction coefficient detecting means comprises a means for calculating the friction coefficient between the driving wheel and the road surface on the basis of the magnitude of said deviation during an acceleration, after the acceleration slip control is started.

6. An acceleration slip control device according to claim 1, wherein said target speed setting means determines said target speed according to the running speed of the vehicle and said friction coefficient detected by said friction coefficient detecting means.

* * * * *

UNITED STATES PATENT AND TRADEMARK OFFICE
CERTIFICATE OF CORRECTION

PATENT NO. : 5,311,433

DATED : May 10, 1994

INVENTOR(S) : Hiroshi IGATA, et al.

It is certified that error appears in the above-identified patent and that said Letters Patent is hereby corrected as shown below:

Column 3, line 63, change "$F=W_{ru}$." to --$F=W_r \cdot u$.--.

Column 6, line 14, change "step" to --steps--.

Column 6, line 60, change "$V_R$." to --$V_R$--.

Column 7, line 27, after "routine" insert --is executed--.

Column 8, line 35, change "$\mu V$" to --$\Delta V$--.

Column 8, line 38, after "running" insert --on--.

Column 10, line 14, change "step" to --steps--.

Column 12, line 6, after "lower" insert --than--.

Signed and Sealed this

Fourth Day of October, 1994

Attest:

BRUCE LEHMAN

*Attesting Officer*  *Commissioner of Patents and Trademarks*